Patented Mar. 16, 1948

2,437,798

UNITED STATES PATENT OFFICE 2,437,798

NEW SECONDARY ORGANIC PHOSPHORUS HALIDES AND PROCESSES FOR MAKING THE SAME

Cheves Walling, Montclair, N. J., assignor to E. I. du Pont de Nemours & Company, Wilmington, Del., a corporation of Delaware No Drawing. Application July 13, 1944, Serial No. 544,838

5 Claims. (Cl. 260—607)

This invention relates to new secondary organic phosphorus halides and to methods for producing the same.

It is known that substituted phosphines react directly with the halogens and that such reactions are in general violent and lead to oxidation or other extreme chemical activity which produces pentavalent phosphorus compounds. Secondary organic phosphorus compounds in which phosphorus is trivalent have been desired as reactants for carrying out various kinds of syntheses, but heretofore the only such secondary organic phosphorus halides which have been produced in so far as I am aware are those in which both substituents are aromatic in nature and the process of making such aromatic compounds required the use of laborious high temperature arylation reactions based on phosphorus trihalides.

It is among the objects of this invention to provide new secondary organic phosphorus halides which are represented in general by the formula RR'PX wherein X represents halogen, R is one of a group consisting of saturated aliphatic, aralkyl and alicyclic radicals, and R' is one of a group consisting of the radicals represented by R and aromatic radicals and wherein phosphorus is trivalent. Another object of the invention is to provide low temperature processes for making the new compounds which employ reactants which are relatively easily available. Other objects of the invention will be apparent from the following description.

The objects of the invention are attained in general by reacting a secondary organic phosphine which is represented by the formula RR'PH in an inert solvent in which the organic phosphine starting compound and the halogen to be reacted therewith are soluble. In general the reaction product can be separated from other products of the reaction by means known to the art.

The invention will be more fully set forth in the following more detailed description which includes examples that are given as illustrative embodiments of the invention and not as limitations thereof. Parts are expressed in parts by weight unless otherwise noted.

Example I

A solution composed of 73 parts of di-n-butyl phosphine dissolved in 200 parts of dry chloroform was made in a flask. The flask was closed except for the provision of means to add reactants, a gas inlet tube and a reflux condenser. An atmosphere of nitrogen was introduced into the flask over the solution and maintained therein during the reaction by passing a slow current of nitrogen into the flask. The contents of the flask were brought to a temperature just below 20° C. and maintained at that temperature by cooling during the reaction, the variation in temperature below 20° C. being not more than about 5° C. A solution composed of 70 parts of bromine dissolved in 150 parts of dry chloroform was then gadually added to the cooled solution in the flask during the course of an hour. Thereafter the reaction mixture was maintained just below 20° C. until the reaction was completed. The completion of the reaction was indicated by the appearance of a white precipitate just previous to completion. Hydrobromic acid was formed during the reaction and it was vented with the excess nitrogen through the reflux condenser.

The dibutyl phosphorus bromide $(C_4H_9)_2PBr$ formed during the reaction is soluble in the reaction mixture and is separated from the white precipitate by filtration under an atmosphere of nitrogen. By fractional distillation in vacuo, the filtrate yielded 55 parts of dibutyl phosphorus bromide. The product has a boiling point of 126°–128° C. at 10 mm. and analysis showed 38.0% bromine and 12.7% phosphorus.

By using an equivalent proportion of chlorine or iodine in the process of the foregoing example instead of bromine, the corresponding chloro- and iodo-compounds were made. These products are represented by the formulae $(C_4H_9)_2PCl$ and $(C_4H_9)_2PI$, respectively. Similarly, by substituting for di-n-butyl phosphine 70 parts of methyl benzyl phosphine or 96 parts of phenyl cyclohexyl phosphine in the process of Example I, methyl benzyl phosphorus bromide and phenyl cyclohexyl phosphorus bromide are obtained.

Di-n-butyl phosphine may be prepared by heating n-butyl iodide, zinc oxide and phosphonium iodide together in a sealed tube to 140°.

In preparing some of the halides, such as the chlorides, it is advantageous to add the chlorine to the reaction mixture in a diluted form. For this purpose a dilute solution of chlorine in an inert solvent may be used, or a mixture of chlorine and an inert gas, such as nitrogen, may be passed into the reaction mixture.

An inert liquid organic solvent is an essential of the reaction mixture and in the specification and claims the term refers to any organic solvent in which the organic phosphine and the halogen are both soluble, which is liquid at the reaction temperature and which does not react materially with the constituents of the reaction mixture or product to form undesired compounds. Illustrations of such inert solvents are carbon tetrachloride, ortho-chlorobenzene and ethylene dichloride. It is desirable to have a slight deficiency of the halogen in the reaction mixture below that which is required to react with all of the hydrogen which is substituted on the phosphorus, in order to avoid the possibility of any halogenation of the organic radical; but equimolecular proportions or even a small excess of halogen may be used.

The reaction may be conducted at any temperature as high as the refluxing temperature and as low as any temperature that the inert solvent is liquid. The better yields are attained at reaction temperatures which are not higher than ordinary room temperatures, say 25° C. and such temperatures are preferred.

Instead of adding the halogen to the reaction mixture in the form of a solution in a liquid organic solvent, it may be added as a gas or as a mixture of the halogen and a gas which is nonreactive in the reaction mixture, such as a mixture of the gaseous halogen and nitrogen or a vapor of the halogen. When the halogen is introduced into the reaction mixture in the form of a gas, it is frequently desirable to use a mixture of the halogen and a non-reactive gas, especially when the more chemically reactive halogens are used, such as chlorine. A mixture of gaseous halogen and any gas which is non-reactive in the reaction mixture can be used to the same effect in the process described in Example I as a solution of the halogen in chloroform, or a part of the halogen can be introduced into the reaction mixture in the form of a solution in an inert solvent and part in the form of a gas.

A great variety of secondary organic phosphines can be used as the starting material, resulting in the corresponding organic phosphorus halo compound. Any saturated aliphatic, aralkyl- or alicyclic secondary phosphine can be used wherein the trivalent phosphorus is substituted once by a radical of the saturated aliphatic, aralkyl or alicyclic series and once by a radical of the saturated aliphatic, aralkyl, alicyclic or aromatic series. The organic radicals may be alike or unlike. The term, saturated aliphatic radical, in the specification and claims refers to the monovalent radicals resulting from the removal of one hydrogen from any saturated aliphatic hydrocarbon. Any of the radicals may be inertly substituted, but they must be devoid of active groups. The term, inertly substituted, in the specification and claims refers to substituents which do not react with halogens and phosphorus halides in the reaction media employed, such as —F, —Cl, —Br, —I, —NO₂, —NHCOR', —OR', —S—R' and —SO₂R' wherein R' is a radical of the alkyl, aralkyl, alicyclic or aryl series.

As illustrative of the class of organic secondary phosphines which may be used as starting compounds are diethyl-beta-methoxy ethyl cetyl-, methyl cyclohexyl-, methyl benzyl-, propyl phenyl-, cyclopentyl benzyl-, cyclohexyl-p-bromphenyl-, dicyclohexyl-, dibenzyl- and benzyl p-nitrophenyl-phosphine.

By treating these compounds in accordance with the processes hereinbefore described, the corresponding halides are produced. Such products are represented by the formula RR'P hal wherein the symbols have the significance hereinbefore explained.

The secondary phosphine halides may be used for various purposes, important among which are their uses as intermediates for the preparation of other organo-phosphorus compounds. In general, the products are highly reactive and they can be used in a variety of reactions where it is desired to combine the halogen with the metal of another metal containing organic compound such as sodium alcoholates. For example, sodium alcoholates can be reacted with appropriate secondary phosphine halides to form the corresponding esters, such as those represented in general by the formulae alkyl O—PR₂ and alkyl O—PRR'.

From the foregoing disclosure it will be recognized that the invention is susceptible of modification without departing from the spirit and scope thereof and it is to be understood that the invention is not restricted to the specific illustrations thereof herein set forth.

I claim:

1. Di-n-butyl bromo phosphine.
2. The process which comprises dissolving an organic secondary phosphine in an inert liquid organic solvent, said phosphine being represented by the formula RR'PH, wherein R is a member of the group consisting of ethyl, propyl, butyl, beta-methoxyethyl, benzyl, cyclohexyl and cyclopentyl radicals, and wherein R' is a member of the group consisting of alkyl radicals of 1 to 16 carbon atoms and benzyl, cyclohexyl, phenyl and inertly substituted phenyl radicals in which said inert substituent is selected from the group consisting of —F, —Cl, —Br, —I, —NO₂, —NHCOR', —OR', —S—R' and —SO₂R', wherein R' has the meaning hereinbefore defined, adding sufficient halogen to replace the hydrogen which is attached to the trivalent phosphorus; passing an inert gas over the reaction mixture; and maintaining a temperature at least as high as the temperature at which the solution is liquid and not higher than the refluxing temperature of the solution, until the hydrogen which is attached to the phosphorus is replaced by halogen, said halogen being one of a group consisting of chlorine, bromine and iodine.
3. The process in accordance with claim 2 in which the reaction temperature is not higher than about 25° C.
4. The process in accordance with claim 2 in which the organic radicals in the reactant RR'PH are aliphatic radicals.
5. The process in accordance with claim 2 in which the halogen is introduced into the reaction mixture by adding a solution of the halogen in an inert solvent.

CHEVES WALLING.

REFERENCES CITED

The following references are of record in the file of this patent:

UNITED STATES PATENTS

| Number | Name | Date |
|---|---|---|
| 2,190,175 | Jolly | Feb. 20, 1940 |

OTHER REFERENCES

Beilstein, Handbuch der Organischen Chemie, vol. XVI, 4th ed., page 763.

Richter, Organic Chemistry, Spielmann translation, 2nd ed., pages 173–174.

Feiser, Organic Chemistry, 1944, page 32.